US012732611B2

(12) United States Patent
Jun et al.

(10) Patent No.: US 12,732,611 B2
(45) Date of Patent: Sep. 8, 2026

(54) IMAGE PROCESSING DEVICE AND OPERATING METHOD OF THE IMAGE PROCESSING DEVICE

(71) Applicant: Samsung Electronics Co., Ltd., Suwon-si (KR)

(72) Inventors: Sungho Jun, Suwon-si (KR); Youngbeom Jung, Suwon-si (KR); Jungyeop Yang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 7 days.

(21) Appl. No.: 18/360,861

(22) Filed: Jul. 28, 2023

(65) Prior Publication Data

US 2024/0073421 A1 Feb. 29, 2024

(30) Foreign Application Priority Data

Aug. 26, 2022 (KR) ........................ 10-2022-0107900

(51) Int. Cl.

*H04N 19/124* (2014.01)
*H04N 19/103* (2014.01)
*H04N 19/127* (2014.01)
*H04N 19/136* (2014.01)
*H04N 19/176* (2014.01)
*H04N 19/182* (2014.01)
*H04N 19/423* (2014.01)

(Continued)

(52) U.S. Cl.

CPC ......... *H04N 19/124* (2014.11); *H04N 19/103* (2014.11); *H04N 19/127* (2014.11); *H04N 19/136* (2014.11); *H04N 19/176* (2014.11); *H04N 19/182* (2014.11); *H04N 19/423* (2014.11); *H04N 19/50* (2014.11); *H04N 19/70* (2014.11); *H04N 19/91* (2014.11)

(58) Field of Classification Search

None

See application file for complete search history.

(56) References Cited

U.S. PATENT DOCUMENTS 8,396,119 B1 3/2013 Linzer
9,077,965 B2 7/2015 Wu et al.

(Continued)

OTHER PUBLICATIONS

Extended European Search Report dated Jan. 26, 2024 issued in corresponding European Appln. No. 23189563.2.

*Primary Examiner* — Lindsay J Uhl

(74) *Attorney, Agent, or Firm* — Harness, Dickey & Pierce, P.L.C.

(57) ABSTRACT

An image processing device and an operating method of the image processing device are disclosed. The image processing device includes a multimedia intellectual property (IP) configured to generate second image data by performing image processing on first image data and an encoder configured to compress the second image data, the encoder is further configured to generate first compressed data by performing quantization and at least one compression processing on a first block of the second image data based on a target compression ratio in a first compression condition, and generate second compressed data by performing the quantization on a second block of the second image data based on a first quantization step in a second compression condition, without performing the at least one compression processing.

7 Claims, 16 Drawing Sheets

(51) Int. Cl.
*H04N 19/50* (2014.01)
*H04N 19/70* (2014.01)
*H04N 19/91* (2014.01)

(56) References Cited

U.S. PATENT DOCUMENTS

| | | | | |
|---|---|---|---|---|
| 10,356,443 | B2 | 7/2019 | Carlavan et al. | |
| 10,887,616 | B2 | 1/2021 | Jun et al. | |
| 11,095,876 | B2 | 8/2021 | Jun et al. | |
| 11,153,586 | B2 | 10/2021 | Jun | |
| 2010/0296745 | A1* | 11/2010 | Strom .................. | H04N 19/176<br>382/233 |
| 2011/0292247 | A1 | 12/2011 | Gharavi-Alkhansari et al. | |
| 2012/0236935 | A1* | 9/2012 | Dutt ..................... | H04N 19/103<br>375/240.03 |
| 2016/0323582 | A1* | 11/2016 | Takeda ................. | H04N 19/146 |
| 2020/0177902 | A1 | 6/2020 | Jun et al. | |
| 2021/0127125 | A1 | 4/2021 | Fruchter et al. | |
| 2021/0203949 | A1* | 7/2021 | Horishita ............. | H04N 19/124 |
| 2022/0036922 | A1 | 2/2022 | Lee | |

* cited by examiner

Figure 1:
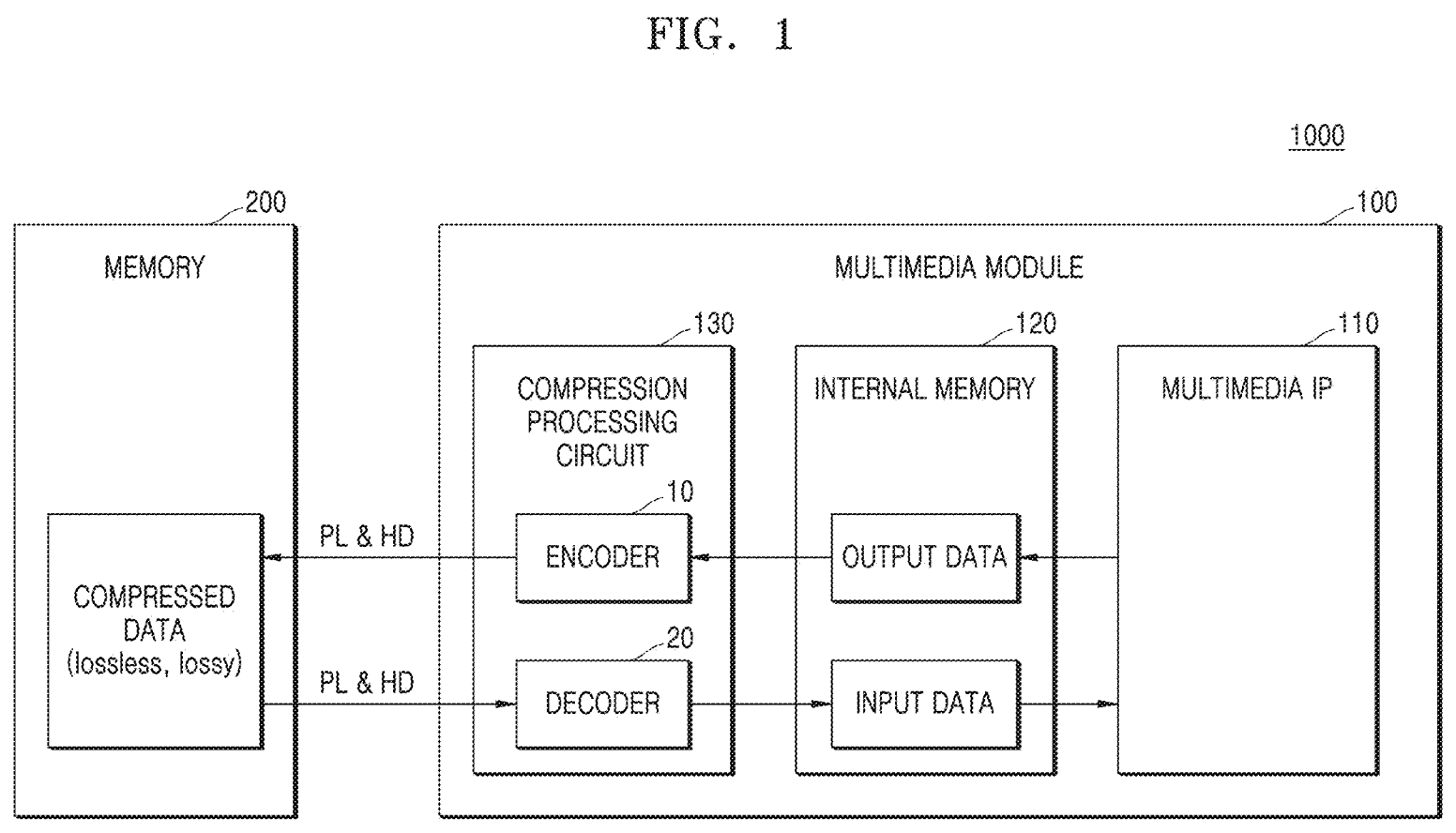

MULTIMEDIA MODULE

110

MULTIMEDIA IP

120

INTERNAL MEMORY

OUTPUT DATA

INPUT DATA

130

COMPRESSION PROCESSING CIRCUIT

10

ENCODER

20

DECODER

PL & HD

PL & HD

200

MEMORY

COMPRESSED DATA (lossless, lossy)

FIG. 6

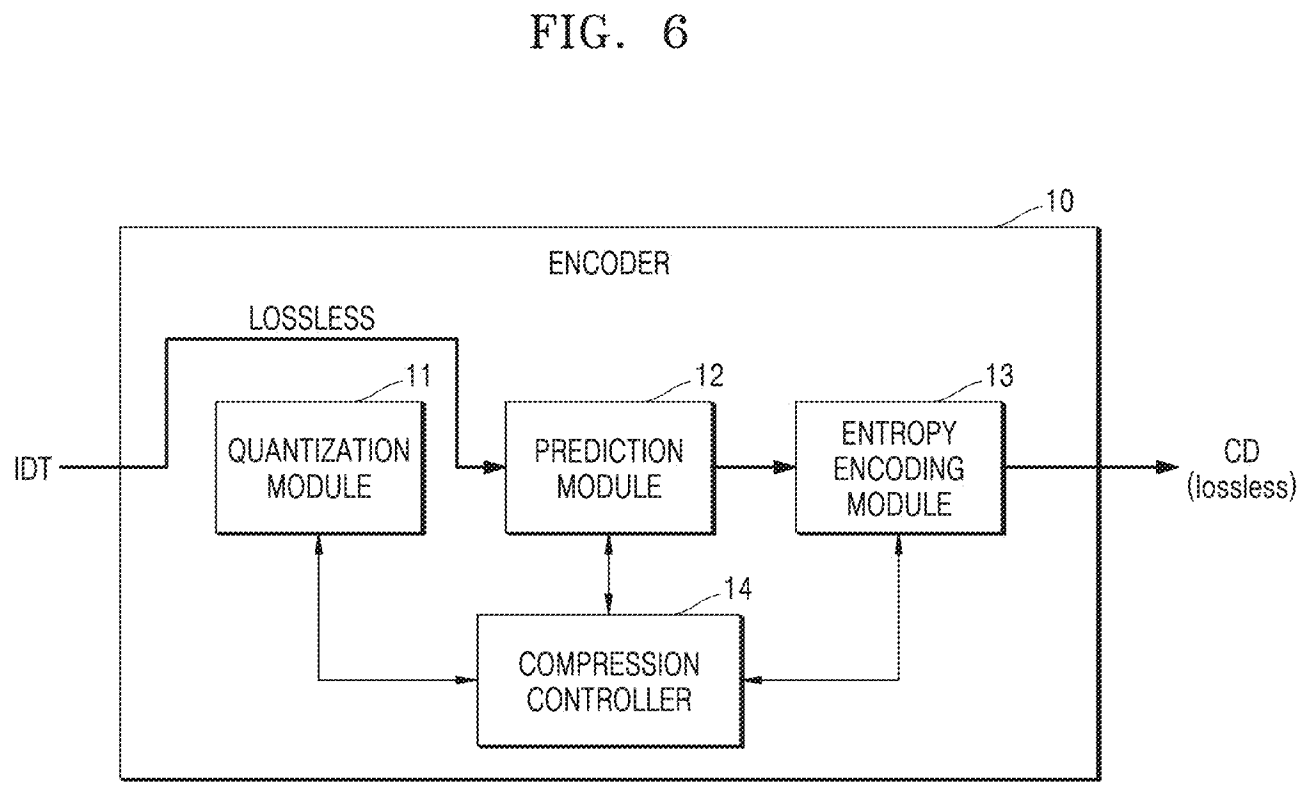

ENCODER
10
11
QUANTIZATION MODULE
LOSSLESS
12
PREDICTION MODULE
13
ENTROPY ENCODING MODULE
14
COMPRESSION CONTROLLER
IDT
CD (lossless)

Figure 9:
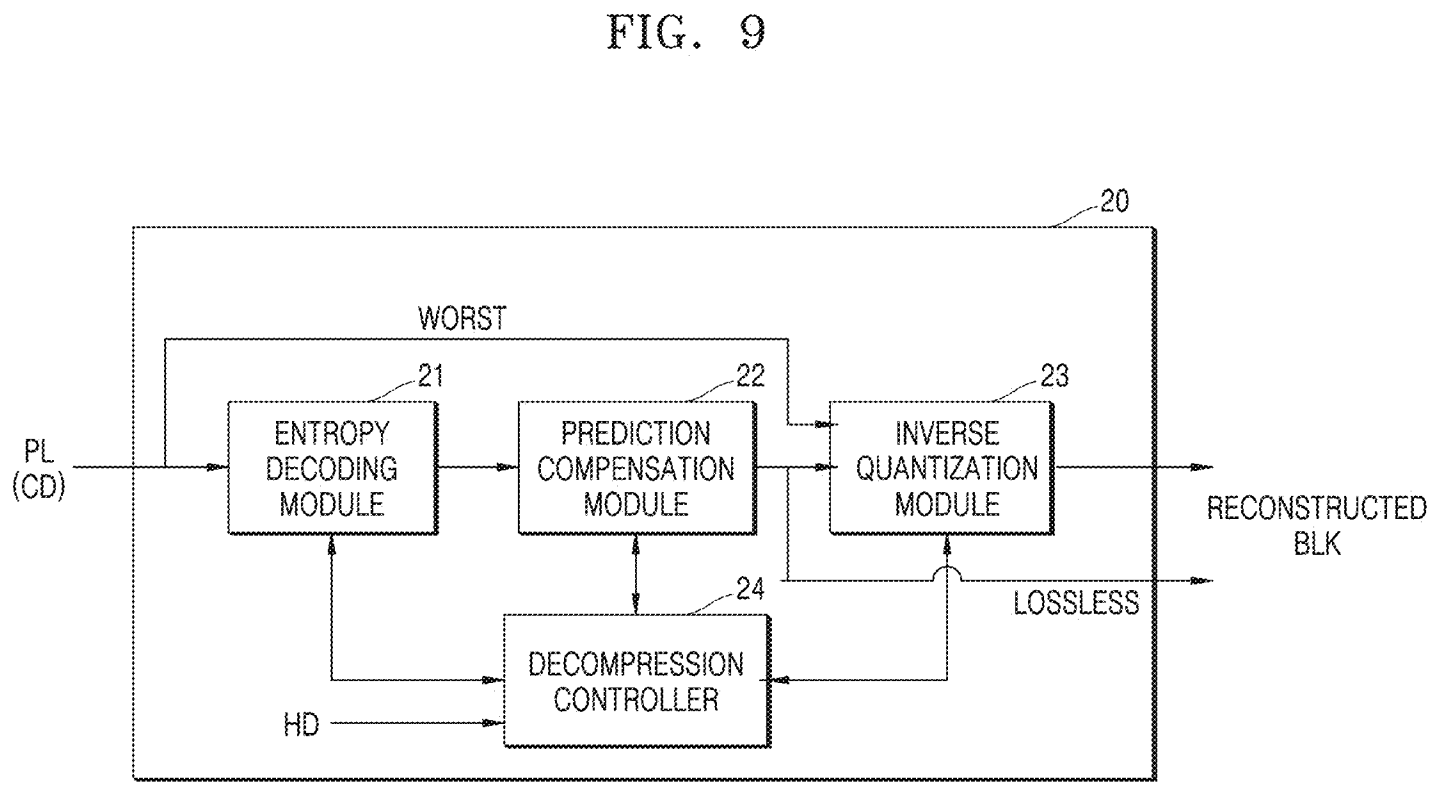

ENTROPY DECODING MODULE 21

PREDICTION COMPENSATION MODULE 22

INVERSE QUANTIZATION MODULE 23

DECOMPRESSION CONTROLLER 24

WORST

LOSSLESS

PL (CD)

HD

RECONSTRUCTED BLK

FIG. 11A

QUALITY PRIORITY MODE (32x4 block)

| BIT-DEPTH | TARGET COMPRESSION RATIO | MAX QSTEP SIZE | CONSTRAINT QSTEP SIZE | WORST OUTPUT BIT-DEPTH | MEMORY FOOTPRINT |
|---|---|---|---|---|---|
| 8bit | 50% | 4 | 2 | 4bit -> 6bit | 96Byte |
| 10bit | 60% | 6 | 4 | 4bit -> 6bit | 96Byte |
| 12bit | 50% | 6 | 4 | 6bit -> 8bit | 128Byte |

FIG. 11B

POWER PRIORITY MODE (32x4 block)

| BIT-DEPTH | TARGET COMPRESSION RATIO | MAX QSTEP SIZE | CONSTRAINT QSTEP SIZE | WORST OUTPUT BIT-DEPTH | MEMORY FOOTPRINT |
|---|---|---|---|---|---|
| 8bit | 50% | 4 | 3 | 4bit --> 5bit | 96Byte |
| 10bit | 60% | 6 | 5 | 4bit --> 5bit | 96Byte |
| 12bit | 50% | 6 | 5 | 6bit --> 7bit | 128Byte |

FIG. 12

| #of BLK | BLK0 | BLK1 | BLK2 |
|---|---|---|---|
| Size of CD | 32 byte | 64 byte | 96 byte |
| HDI | 1 | 2 | 3 |
| Case | Normal | Normal | Worst |

Y plane of YUV image (8bit)
BLK0
BLK1
BLK3
BLK2
YYYY...
4 pixels
32 pixels
32 pixels
64 pixels
HD0
HD1
HD2
HD3
4'd2
4'd2
4'd3
4'd2
...
Header
Y plane memory
(Payload)
footprint
(96 byte)
32x4
32x4
32x4
32x4
...
Header
Compression ratio
50%
(normal case)
50%
(normal case)
25%
(worst case)
50%
(normal case)

FIG. 14A
(Comparative Example)

FIG. 14B
(Comparative Example)

FIG. 14C

IMAGE PROCESSING DEVICE AND OPERATING METHOD OF THE IMAGE PROCESSING DEVICE

CROSS-REFERENCE TO RELATED APPLICATION

This application is based on and claims priority under 35 U.S.C. § 119 to Korean Patent Application No. 10-2022-0107900, filed on Aug. 26, 2022, in the Korean Intellectual Property Office, the disclosure of which is incorporated by reference herein in its entirety.

BACKGROUND

The inventive concepts relate to an image processing device, and more particularly, to an image processing device for performing lossy compression on image data based on a quantization step size limitation, and an operating method of the image processing device.

As the desire for higher-resolution and/or higher-frame rate video images has emerged, the amount of access to a memory by several multimedia intellectual properties (IPs) of an image processing device, e.g., bandwidth, has increased. When the bandwidth increases, the processing power of the image processing device may reach its limit, resulting in a reduction in the speed of the image processing device during a video image recording and reproducing operation. Accordingly, a scheme of compressing the size of data when multimedia IPs access the memory has been considered. For example, data may be compressed before the data is written to the memory, and the compressed data may be decompressed after the data is read from the memory. A lossy compression scheme including quantization is used to increase a compression ratio of a higher-resolution image. In the case of an image block with higher spatial complexity, a quantization error may increase, resulting in deterioration of quality.

SUMMARY

The inventive concepts provide an image processing device capable of reducing or preventing deterioration of quality when performing lossy compression on image data based on quantization, and an operating method of the image processing device.

According to an aspect of the inventive concepts, there is provided an image processing device including a multimedia intellectual property (IP) configured to generate second image data by performing image processing on first image data, and an encoder configured to compress the second image data, the encoder may generate first compressed data by performing quantization and at least one compression processing on a first block of the second image data based on a target compression ratio in a first compression condition, and generate second compressed data by performing the quantization on a second block of the second image data based on a first quantization step in a second compression condition, without performing the at least one compression processing.

According to another aspect of the inventive concepts, there is provided an image processing device including a processing circuit configured to generate second image data by performing image processing on first image data and a compression processing circuit configured to generate first compressed data by repeating compression processing including quantization, prediction processing, and encoding while increasing a quantization step with respect to the second image data, the compression processing circuit may write the first compressed data and a first header corresponding to the first compressed data to a memory when a compression ratio of the first compressed data is equal to or greater than a target compression ratio, generate second compressed data by performing the quantization on the second image data using a first quantization step when the compression ratio of the first compressed data is less than the target compression ratio and the increased quantization step is greater than the first quantization step, and write the second compressed data and a second header corresponding to the second compressed data to the memory.

According to another aspect of the inventive concepts, there is provided an operating method of an image processing device including generating first compressed data by performing quantization on input image data in block units and generating second compressed data by performing prediction processing and encoding on the first compressed data, storing the second compressed data and a first header corresponding to the second compressed data in a memory when a compression ratio of the second compressed data satisfies a target compression ratio, generating third compressed data by performing quantization on the input image data based on a constraint quantization step when the compression ratio of the second compressed data does not satisfy the target compression ratio, and a quantization step is greater than the constraint quantization step, and storing the third compressed data and a second header corresponding to the third compressed data in the memory.

According to another aspect of the inventive concepts, there is provided an image processing device including a multimedia intellectual property (IP) configured to generate second image data by performing image processing on first image data, a compression processing circuit configured to generate compressed data by performing lossy compression on the second image data based on quantization, and output the compressed data and a header including a compression ratio of the compressed data, and a memory storing the compressed data and the header.

BRIEF DESCRIPTION OF THE DRAWINGS

Example embodiments of the inventive concepts will be more clearly understood from the following detailed description taken in conjunction with the accompanying drawings in which:

FIG. 1 is a block diagram schematically illustrating an image processing device according to example embodiments;

FIG. 6 illustrates a data path when an encoder performs lossless compression according to example embodiments;

FIG. 9 is a block diagram schematically illustrating a decoder according to example embodiments;

FIGS. 11A and 11B are tables illustrating a quality priority mode and a power priority mode during lossy compression according to example embodiments;

FIG. 12 is a table illustrating a data amount of compressed data, a header index, and determining a case based on the header index during lossy compression according to example embodiments;

FIGS. 14A, 14B and 14C are diagrams comparing lossy compression according to example embodiments and lossy compression and lossless compression according to comparative examples.

DETAILED DESCRIPTION OF EXAMPLE EMBODIMENTS

Hereinafter, example embodiments of the inventive concepts will be described in detail with reference to the accompanying drawings.

FIG. 1 is a block diagram schematically illustrating an image processing device according to example embodiments.

An image processing device 1000 may include a multimedia module 100 and a memory 200, and the multimedia module 100 may include a multimedia intellectual property (IP) 110, an internal memory 120, and/or a compression processing circuit 130.

Figure 2:
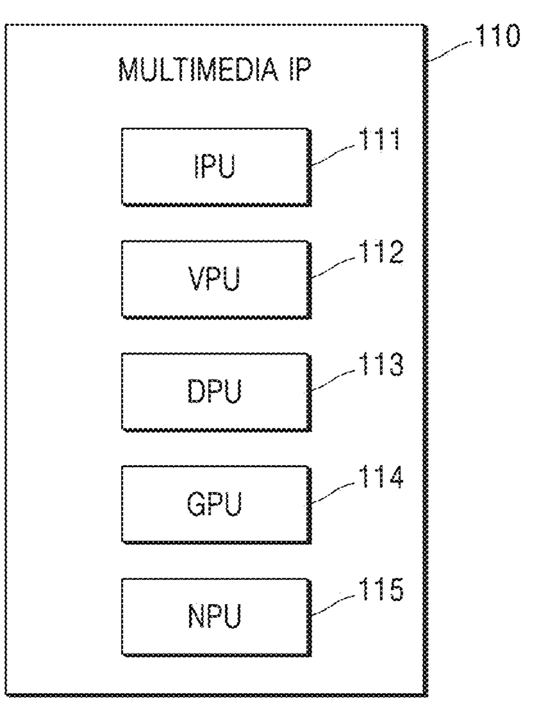
FIG. 2 is a block diagram illustrating a multimedia intellectual property (IP)

The multimedia IP 110 may perform image processing on received input data (e.g., moving or still images, raw image data, etc. as image data) for changing quality or format of the input data, or for displaying the input data on a display. The multimedia IP 110 may receive the image data from an external device, for example, the memory 200 or a camera (not shown). As shown in FIG. 2, the multimedia IP 110 includes a plurality of IPs, and each of the plurality of IPs may receive the image data from the external device or another IP.

FIG. 2 is a block diagram illustrating the multimedia IP 110.

Referring to FIG. 2, the multimedia IP 110 may include at least one of an image processing unit (IPU) 111, a video processing unit (VPU) 112, a display processing unit (DPU) 113, a graphics processing unit (GPU) 114, and/or a neural network processing unit (NPU) 115. The IPU 111, the VPU 112, the DPU 113, the GPU 114, and/or the NPU 115 may be implemented in hardware, such as a logic circuit, a field-programmable gate array (FPGA), a microprocessor, etc., or a combination of hardware and software (or firmware).

The IPU 111 may change the format of received image data or correct the quality of the image data.

For example, the IPU 111 may receive RGB format image data as input data and convert the RGB image data into YUV format image data. In some example embodiments, the RGB format means a data format in which colors are expressed based on the three primary colors of light. That is, the RGB format is a scheme of expressing an image using three types of colors of red, green, and blue. In contrast, the YUV format means a data format in which brightness, that is, a luma signal and a chroma signal, is separately expressed. That is, Y denotes a luma signal and U (Cb) and V (Cr) denote chroma signals. U means a difference between luma signal and blue signal components, and V means a difference between luma signal and red signal components. In some example embodiments, the items of Y, U (Cb), and V (Cr) may be defined as a plane. Because the human eye is sensitive to a luma signal but less sensitive to a color signal, YUV format data may be more easily compressed than RGB format data.

For example, the IPU 111 may correct quality of the received image data by performing image processing, such as adjusting a gamma value of the image data, adjusting luma, widening a dynamic range (DR), or removing noise, etc.

The VPU 112 may correct quality of a received video image, or perform image recording and reproduction, such as camcoding of the video image, play back, etc.

The DPU 113 may perform image processing for displaying the received image data on the display. The DPU 113 may display the received image on the display. For example, the DPU 113 may change a format of the received image data to a format suitable for display on the display, or correct the image data based on a gamma value corresponding to the display.

The GPU 114 may calculate and generate two-dimensional or three-dimensional graphics. The GPU 114 may be specialized in processing graphic data to process graphic data in parallel.

The NPU 115 may perform image processing on image data received based on a trained neural network, or derive a plurality of features from the image data, and recognize an object, background, etc. included in the image data based on the plurality of features. The NPU 115 may be specialized in an operation of the neural network to process image data in parallel.

The multimedia IP 110 may further include an IP such as an image signal processor (ISP), a shake correction module (G2D), a multi-format codec (MFC), etc.

Referring to FIG. 1, the internal memory 120 may temporarily store output data (e.g., output image data) output from the multimedia IP 110 or input data (e.g., input image data) input to the multimedia IP 110. The internal memory 120 may be implemented as static random access memory (SRAM), a cache, a frame buffer, etc.

The compression processing circuit 130 may include an encoder 10 and/or a decoder 20, and may compress the output image data output from the multimedia IP 110 and write (or store) the compressed data to the memory 200, or read the compressed data from the memory 200 to decompress the compressed data, and provide the decompressed data to the multimedia IP 110 as input data. The image data may be divided into a plurality of blocks with the same size, and the compression processing circuit 130 may perform compression and decompression in block units. Hereinafter, 'compression of image data' means compressing image data in block units. In addition, 'compressed data' corresponds to one block of image data.

Although not shown, the compression processing circuit 130 may write the compressed data to the memory 20 or read the compressed data from the memory 200 through a direct memory access (DMA) circuit.

The encoder 10 may perform lossy compression or lossless compression on received image data (e.g., output data of the multimedia IP 110). In some example embodiments, lossless compression means compression without data loss, and is a scheme in which a compression ratio varies depending on data. In contrast, lossy compression means compression in which data is partially lost, may have a compression ratio higher than lossless compression, and a preset compression ratio (e.g., a fixed compression ratio). Lossy compression may include a quantization operation based on a quantization step size (or quantization step value) and at least one other compression processing. As the quantization step size (hereinafter, the quantization step is referred to as QP) increases, data loss increases, and a quantization error may occur.

On the other hand, the encoder 10 according to example embodiments may perform lossy compression on the image data based on a preset compression ratio (e.g., a target compression ratio) and a preset first QP size (or referred to as a constraint QP size).

The encoder 10 may repeatedly perform a compression process (e.g., quantization and at least one other compression processing) while increasing an initial value (e.g., default QP) of the QP size with respect to a block of the image data. When the compression ratio of the compressed data satisfies the target compression ratio, that is, when the compression ratio of the compressed data is equal to or greater than the target compression ratio, the encoder 10 may complete compression and write the compressed data to the memory 200. As described above, when compressed data of which the compression ratio is equal to or greater than the target compression ratio is generated by quantization and at least one other compression processing, a block on which compression has been performed and the compressed data may be referred to as a normal case (or may be in a first compression condition).

When the compression ratio of the compressed data is less than the target compression ratio, the encoder 10 may increase the QP size and perform the compression process again based on the increased QP size. However, when the QP size (e.g., the current QP size) is greater than the first QP size, the encoder 10 may perform the quantization step on the block of the image data based on the first QP size to generate compressed data, and store the compressed data in the memory 200. The compression ratio of the compressed data may exceed the target compression ratio. As described above, when compressed data having a compression ratio lower than the target compression ratio is generated by performing quantization based on the first QP size on image data (or the block of image data), the block on which compression has been performed and the compressed data may be referred to as a worst case (or may be in a second compression condition).

In other words, the encoder 10 may preset a threshold value of the QP size, that is, the first QP size (or constraint QP size), and control the QP size not to exceed the first QP size. In this regard, the encoder 10 may allow the compression ratio of the compressed data to exceed the target compression ratio. Accordingly, the compression ratio of the compressed data output from the encoder 10 may be equal to or greater than the target compression ratio or less than the target compression ratio.

The encoder 10 may generate a payload PL including compressed data and a header HD including an index indicating a compression ratio (or normal case or worst case) of the compressed data. The compression processing circuit 130 may write the compressed data, that is, the payload PL and the header HD, to the memory 200, by transmitting the payload PL, the header HD, and an address at which the payload PL and the header HD are to be stored to the memory 200.

When lossless compression is performed, the compression ratio of compressed data may vary, and as described above, when lossy compression is performed based on the target compression ratio and the preset first QP size, the compression ratio of the compressed data may vary. The compression processing circuit 130 may provide information that may be used when decompressing the compressed data later to the decoder 20, by writing the index indicating the compression ratio, for example, the header HD including a header index together, to the memory 200 when writing the compressed data to the decoder 20.

The decoder 20 may read the compressed data stored in the memory 200 and decompress the compressed data. The decoder 20 may read the payload PL and the header HD of the compressed data and determine a compression ratio of the compressed data based on the header index included in the header HD. In addition, when lossy compression is performed on the compressed data based on the target compression ratio and the first QP size, the decoder 20 may determine whether the compressed data is a worst case or a normal case based on the header index, and determine a decompression scheme according to the case.

For example, when the compressed data is the worst case, the decoder 20 may decompress the compressed data, by performing inverse quantization. When the compressed data is the normal case, the decoder 20 may decompress the compressed data, by performing inverse quantization and at least one decompression processing corresponding to at least one compression processing.

The memory 200 may store the compressed data. The memory 200 may be implemented as a volatile memory, such as dynamic random access memory (DRAM), or a resistive memory, such as ferroelectric RAM (FeRAM), resistive RAM (ReRAM), phase change RAM (PRAM), or magnetic RAM (MRAM). The memory 200 may be implemented as a last level cache. Hereinafter, it is assumed that the memory 200 is DRAM.

When image data to be compressed includes a block with higher spatial complexity and lossy compression based on the target compression ratio is performed on the block, the QP size may excessively increase in order to satisfy the target compression ratio. Accordingly, a quantization error may increase, and quality may deteriorate. Because processing circuits provided in the multimedia IP 110, for example, IPs that perform image processing, are connected to each other, when quality deteriorates in a specific IP, error propagation to another IP may occur. Therefore, quality is a factor in the operation of the multimedia IP 110.

According to the compression method of the encoder 10 according to example embodiments, lossy compression is performed based on the target compression ratio and the constraint QP size, thereby increasing the compression ratio of image data, and compressing even the block with higher spatial complexity (e.g., an edge image or a block with a lot of noise), without deteriorating quality.

Figure 3:
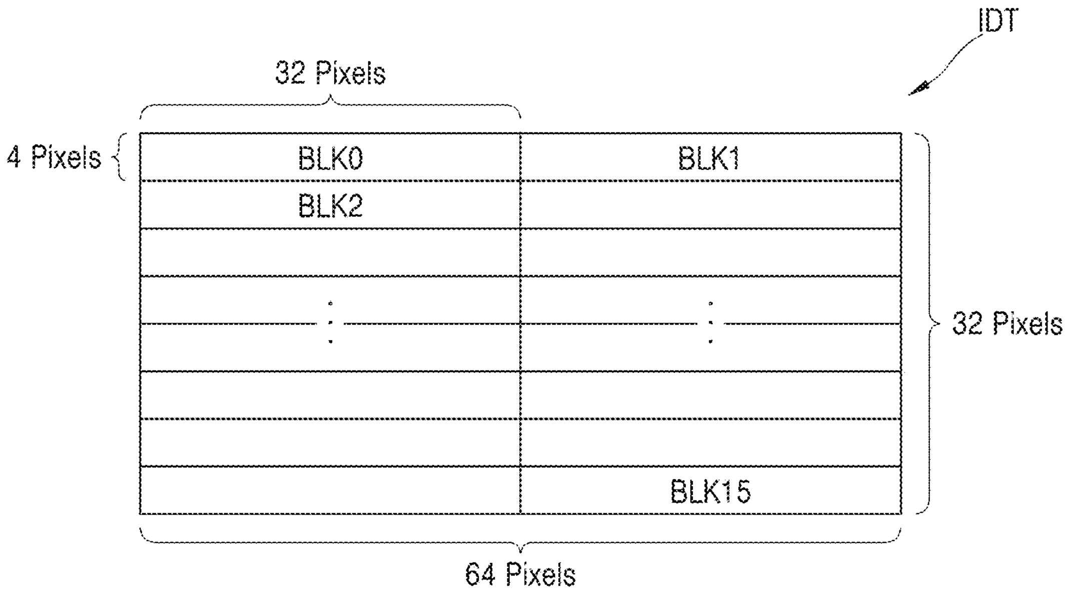
FIG. 3 illustrates blocks of image data to be compressed based on a compression method according to example embodiments.

FIG. 3 illustrates blocks of image data to be compressed based on a compression method according to example embodiments.

Referring to FIG. 3, image data IDT may be divided into a plurality of blocks, for example, a first block BLK0 to a sixteenth block BLK15. For example, it is assumed that the image data IDT includes pixels arranged in 64 columns×32 rows (hereinafter referred to as 64×32 pixels), and the encoder (10 in FIG. 1) performs compression in block units including 32×4 pixels.

The image data IDT may be divided into the first block BLK0 to the sixteenth block BLK15. For example, compression may be performed sequentially or in parallel on a plurality of blocks of the image data IDT from the upper left, for example, the first block BLK0, to the lower right, for example, the sixteenth block BLK16.

Figure 4:
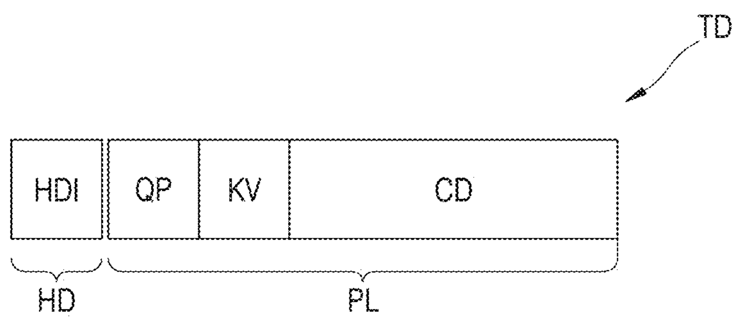
FIG. 4 is a diagram illustrating a transmission structure of compressed data generated by an image processing device according to example embodiments.

FIG. 4 is a diagram illustrating a transmission structure of compressed data generated by an image processing device according to example embodiments.

The compression processing circuit (130 of FIG. 1) may generate transmission data TD including the payload PL and the header HD and transmit the transmission data TD to the memory 200. The payload PL may include compressed data CD and a quantization step QP. The payload PL may further include a parameter related to at least one other compression processing, for example, a k value KV used during encoding by an entropy encoding module (13 of FIG. 4).

The header HD may include a header index HDI, and the header index HDI may indicate a compression ratio of the compressed data CD. When the compressed data CD is generated by lossy compression based on the target compression ratio and the constraint QP size, the header index HDI may indicate whether the compressed data CD is a worst case or a normal case. In this regard, the header index HDI may be a positive integer, and may be a value representing the data amount of the compressed data CD as a multiple of an access unit of the memory 200. The header index HDI will be described in more detail with reference to FIG. 12.

Figure 5:
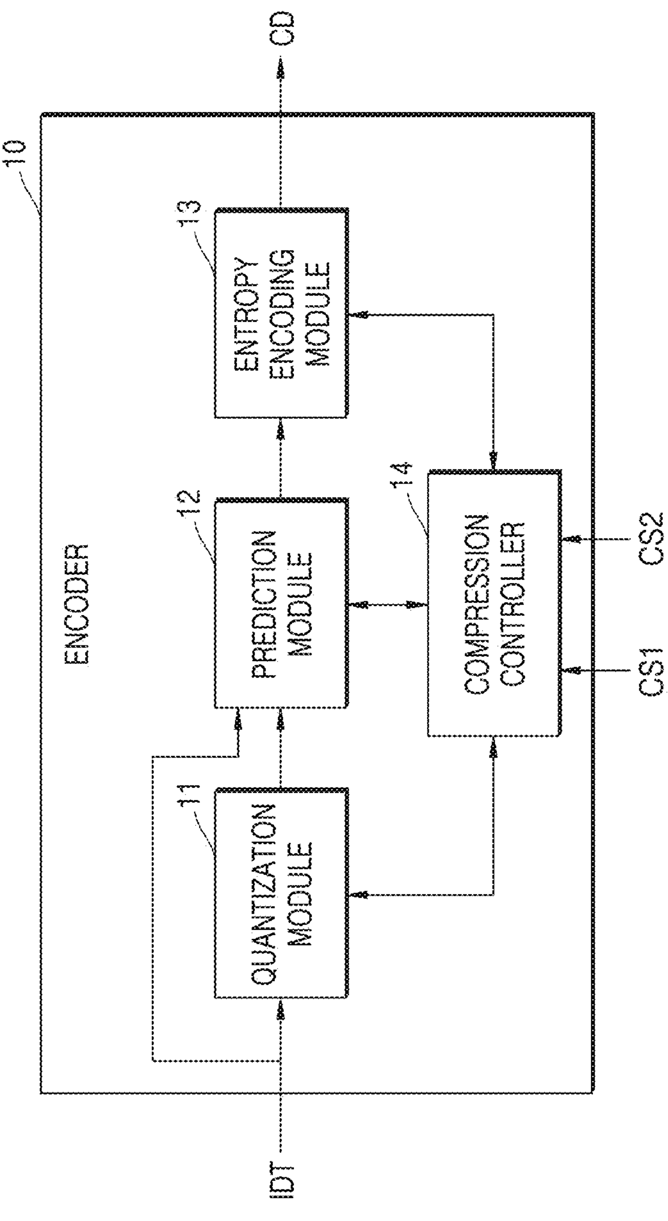
FIG. 5 is a block diagram schematically illustrating an encoder according to example embodiments.

FIG. 5 is a block diagram schematically illustrating the encoder 10 according to example embodiments.

Referring to FIG. 5, the encoder 10 may include a quantization module 11, a prediction module 12, an entropy encoding module 13, and/or a compression controller 14. Each of the quantization module 11, the prediction module 12, the entropy encoding module 13, and the compression controller 14 may be implemented as hardware or a combination of hardware and software (or firmware).

The quantization module 11 may quantize the image data IDT in block units based on the QP size and output the quantized data (hereinafter referred to as first data). The quantization module 11 may remove a lower bit among a plurality of bits constituting a pixel with respect to each of a plurality of pixels included in a block. The quantization module 11 may remove the lower bit of the pixel based on the QP size. For example, when the QP size is 1, a lower 1 bit of the pixel may be removed, and when the QP size is 2, the lower 2 bits of the pixel may be removed. The removed low bit may not be restored later and may be lost. Accordingly, the quantization module 11 may operate during lossy compression.

For example, the quantization module 11 may select a representative value, by multiplying a data value of the pixel by a quantization coefficient determined based on the QP size, and may discard a decimal place. In some example embodiments, the quantization coefficient may be defined as/$(2^n-1)$(n=QP size).

For example, a pixel may be 8-bit data, and a data value of the pixel may be between 0 and $2^8-1=255$). When a target compression ratio is 50%, the QP size may be 1 to 4. The minimum QP size may be 1, and the maximum QP size may be 4. When lossy compression is performed, a predetermined or alternatively, desired first QP size (constraint QP size) may be greater than the minimum QP size and smaller than the maximum QP size.

The prediction module 12 may represent received data, for example, the image data IDT or first data provided from the quantization module 11, by dividing the received data into prediction data and residual data. For example, when one pixel has a value of 0 to 255, 8-bit data per pixel may be required to express the value of 0 to 255. In this regard, when an adjacent pixel has a similar value, there is no loss of data even when only a difference, e.g., a residual, from the adjacent pixel is expressed, and the number of data bits used to represent the pixel may be greatly reduced. For example, when pixels having values of (253, 254, 255) are continuous, and the prediction data is set to 253, residual data representation of (253 (prediction), 1 (residual), 2 (residual)) may be sufficient, and, the number of bits per pixel for representing such residual data may be very small to 2 bits.

Accordingly, the prediction module 12 may compress the overall data size by dividing the data into prediction data and residual data. In some example embodiments, various methods may be used to determine what value the prediction data has.

The prediction module 12 may perform prediction in pixel units or prediction in region units. In this regard, a region may mean a region formed by a plurality of adjacent pixels.

The entropy encoding module 13 may compress data (hereinafter referred to as second data) output from the prediction module 12 through entropy coding. In some example embodiments, entropy coding may utilize a scheme of allocating the number of bits according to the frequency.

The entropy encoding module 13 may compress the second data using Huffman coding. Alternatively, the entropy encoding module 13 may compress the second data through exponential golomb coding or golomb rice coding. In this regard, the entropy encoding module 13 may generate a table based on the k value, thereby simply compressing the second data.

The compression controller 14 may control operations of the quantization module 11, the prediction module 12, and/or the entropy encoding module 13, and may control a compression process. The compression controller 14 may receive control signals and control operations of the quantization module 11, the prediction module 12, and the entropy encoding module 13 based on the control signals. In this regard, the control signals may be provided from the multimedia IP (110 in FIG. 1) according to setting of an application executing the multimedia IP 110 (e.g., whether the application requires higher quality or a higher compression ratio). For example, values set in a firmware register of the multimedia IP 110 may be received as the control signals.

For example, the compression controller 14 may receive a first control signal CS1 instructing lossy compression or lossless compression, and control the quantization module 11, the prediction module 12, and/or the entropy encoding module 13, such that lossy compression or lossless compression is performed based on the first control signal CS1.

When the first control signal CS1 instructing lossless compression is received, the compression controller 14 may control the image data IDT to be provided to the prediction module 12, and may control the prediction module 12 and the entropy encoding module 13 to operate and the quantization module 11 not to operate.

When the first control signal CS1 instructing lossy compression is received, the compression controller 14 may control the image data IDT to be provided to the quantization module 11, and may control the quantization module 11, the prediction module 12, and/or the entropy encoding module 13 to operate. The compression controller 14 may determine the first QP size and increase the QP size while lossy compression is performed. In example embodiments, when lossy compression is performed, the compression controller 14 may receive a second control signal CS2 indicating a quality priority mode or a power priority mode, and determine the first QP size according to the priority mode. This will be described in detail with reference to FIGS. 11A and 11B.

The compression controller 14 may also determine the size (footprint) of a region in the memory 200 in which the compressed data CD is to be stored, and determine an address (e.g., a logical address) of the memory 200 in which the compressed data CD is to be stored. When lossy compression is performed, the compression controller 14 may determine a footprint based on a block size, a bit-depth constituting a pixel, a target compression ratio, and a constraint QP size. The compression controller 14 may determine the footprint to be an integer multiple of an access unit of the memory 200.

FIG. 6 illustrates a data path when the encoder 10 performs lossless compression according to example embodiments.

Referring to FIG. 6, when lossless compression is performed, the image data IDT may be provided to the prediction module 12 by bypassing the quantization module 11. The prediction module 12 and the entropy encoding module 13 may operate to perform lossless compression on the image data IDT.

Figure 7A:
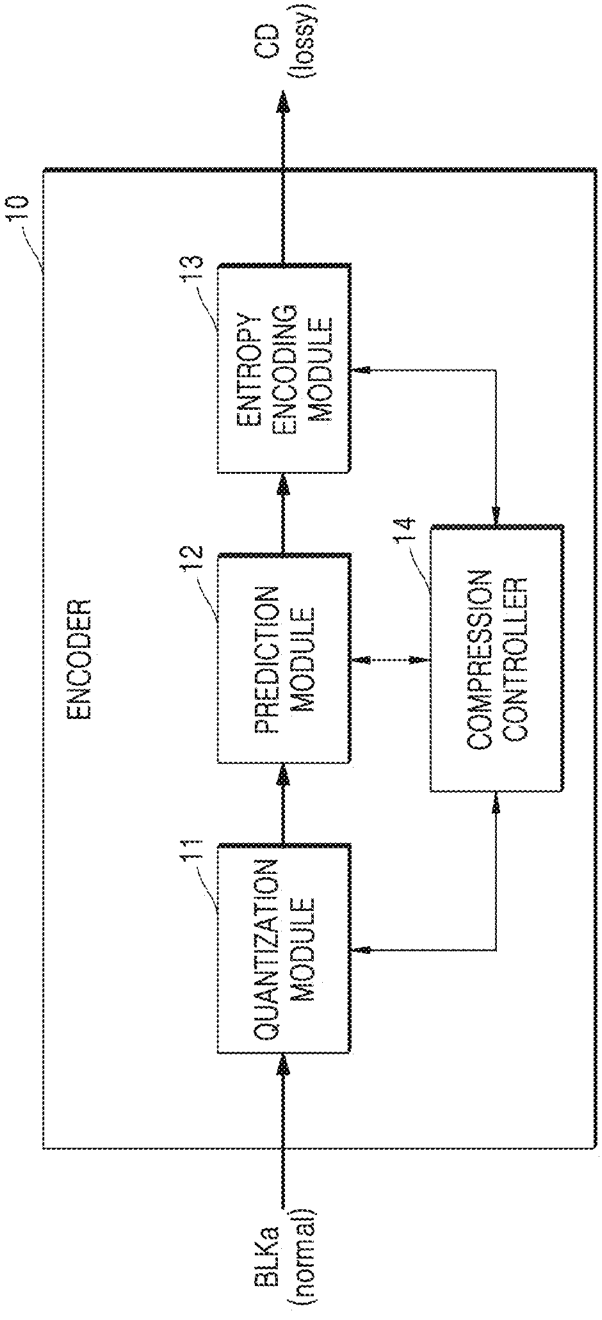
FIGS. 7A and 7B illustrate data paths when an encoder performs lossy compression according to example embodiments.
Figure 7B:
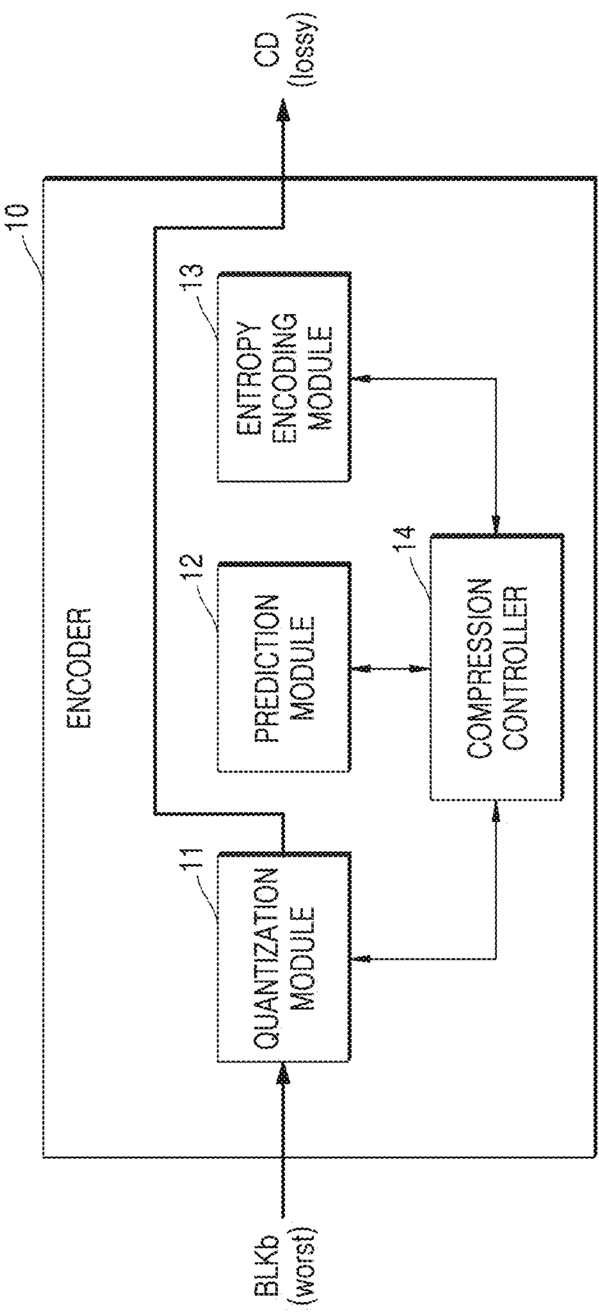

FIGS. 7A and 7B illustrate data paths when an encoder performs lossy compression according to example embodiments. FIG. 7A shows a normal case, and FIG. 7B shows a worst case.

Referring to FIG. 7A, when a block BLKa of the image data IDT to be compressed is the normal case, the block BLKa may be provided to the quantization module 11. An output of the quantization module 11, e.g., first data, may be input to the prediction module 12, and prediction processing may be performed on the first data. An output of the prediction module 12, e.g., second data, may be input to the entropy encoding module 13. Entropy encoding may be performed on the second data to generate the compressed data CD.

In example embodiments, a compression process including quantization, prediction processing, and entropy encoding may be repeatedly performed while the QP size increases until a compression ratio of the compressed data CD reaches a target compression ratio.

Referring to FIG. 7B, when a block BLKb of the image data IDT to be compressed is the worst case, the block BLKb may be provided to the quantization module 11, and quantization may be performed on the block BLKb based on the constraint QP size. Quantization may be performed on the block BLK to generate the compressed data CD. At this time, prediction processing and entropy encoding are not performed.

Whether the block BLKb is the worst case may be determined as the compression process described with reference to FIG. 7A is performed. When the compression process is performed, the compression ratio of the compressed data CD does not reach the target compression ratio, and the QP size is larger than the constraint QP size, the block BLKb may be determined to be the worst case, and, as described with reference to FIG. 7B, the block BLKb may be quantized by the quantization module 11 based on the constraint QP size, and thus, the block BLKb may be compressed.

Figure 8:
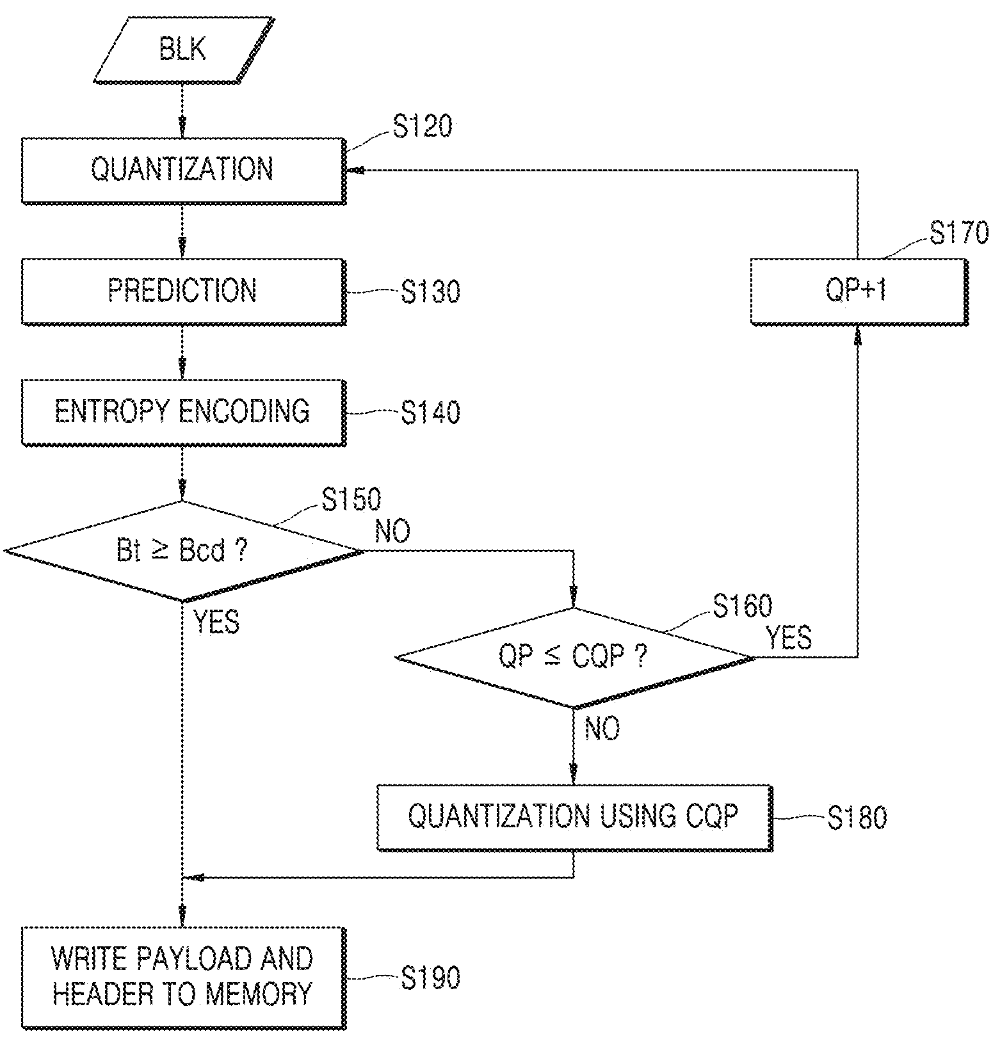
FIG. 8 is a flowchart illustrating a lossy compression method according to example embodiments.

FIG. 8 is a flowchart illustrating a lossy compression method according to example embodiments.

Referring to FIGS. 8 and 5, a block BLK of the image data IDT may be received by the encoder 10. The quantization module 11 may perform quantization on the block BLK (S120). The quantization module 11 may remove lower bits among bits of a pixel with respect to each of pixels included in the block BLK, and the number of lower bits to be removed may depend on an initial value of the QP size. For example, when the initial value of the QP size is 1, one lower bit of the pixel, for example, a least significant bit (LSB), may be removed. When the initial value of the QP size is 2, two lower bits of the pixel may be removed.

For example, when the block BLK includes 32×4 pixels and each pixel is 8-bit data, the data amount of the block BLK may be 128 bytes (1 byte is 8 bits). When the QP size is 2, two lower bits of the pixel are removed, and the data amount of quantized data is 96 bytes. Accordingly, it may be seen that the block BLK is compressed to 25%.

The prediction module 12 may perform prediction processing on an output of the quantization module 11 (S130). As described above, the prediction module 12 may represent the pixel by dividing the pixel into prediction data and residual data in pixel units or in region units.

The entropy encoding module 13 may perform entropy encoding on the output of the prediction module 12, for example, second data (S140).

The compression controller 14 may determine whether a compression ratio of the output of the entropy encoding module 13, for example, compressed data, reaches a target compression ratio (S150). In example embodiments, the compression ratio may be determined by a coded bit-depth Bcd. In some example embodiments, the coded bit-depth Bcd may be a value obtained by dividing the data amount of the compressed data by the number of pixels included in the block BLK. When the bit-depth is less than or equal to a target bit number Bt, it may be determined that the compression ratio of the compressed data is equal to or greater than the target compression ratio. In this regard, the block BLK and the compressed data may be determined as a normal case.

When the compression ratio of the compressed data is equal to or greater than the target compression ratio, compression may end, and the encoder 10 (or the compression processing circuit 130 in FIG. 1) may write a payload including the compressed data and a header including a header index of the compressed data to the memory (200 of FIG. 1) (S190). In some example embodiments, when the compression ratio of the compressed data is equal to or greater than the target compression ratio, the compressed data and the block BLK may be determined as a normal case.

When the compression ratio of the compressed data is less than the target compression ratio, that is, when the compression ratio does not reach the target compression ratio, the compression controller 14 may determine whether the QP size is equal to or less than the constraint QP size CQP (S160). When the QP size is less than or equal to the constraint QP size, the compression controller 14 may increase the QP size by 1 (S170), quantization may be performed based on the increased QP size (S120), and prediction (S130) and entropy encoding (S140) may be repeatedly performed based on the increased QP size.

When the QP size is larger than the constraint QP size, the quantization module 11 may perform quantization based on the constraint QP size CQP (S180). In other words, it is determined that the block BLK is the worst case, and quantization may be performed on the block BLK based on the constraint QP size CQP to generate the compressed data. Accordingly, it is possible to reduce or prevent the QP size from further increasing, that is, a quantization error of the compressed data from further increasing.

The encoder 10 (or the compression processing circuit 130 in FIG. 1) may write the payload including the compressed data and the header including the header index of the compressed data to the memory (200 in FIG. 1) (S190). The header index may indicate a compression ratio of the compressed data, and may indicate whether the compressed data and the block BLK are the normal case or the worst case.

FIG. 9 is a block diagram schematically illustrating the decoder 20 according to example embodiments.

Referring to FIG. 9, the decoder 20 may include an entropy decoding module 21, a prediction compensation module 22, and/or an inverse quantization module 23. The entropy decoding module 21, the prediction compensation module 22, and/or the inverse quantization module 23 may be components respectively corresponding to the entropy encoding module 13, the prediction module 12, and/or the quantization module 11 included in the encoder 10 of FIG. 5. Each of the entropy decoding module 21, the prediction compensation module 22, and the inverse quantization module 23 may be implemented as hardware or a combination of hardware and software (or firmware).

The payload PL including the compressed data CD may be provided to the entropy decoding module 21 or the inverse quantization module 23. For example, when the compressed data CD is lossless compressed, or when the compressed data CD is lossy compressed and is a normal case, the payload PL may be provided to the entropy decoding module 21. When the compressed data CD is lossy compressed and is a worst case, the payload PL may be provided to the inverse quantization module 23 by bypassing the entropy decoding module 21 and the prediction module 22.

The entropy decoding module 21 may decompress data compressed by the entropy encoding module (13 of FIG. 5). The entropy decoding module 21 may perform decompression through Huffman coding, exponential golomb coding, or golomb rice coding. Because the payload PL includes a k value, the entropy decoding module 21 may perform decoding using the k value.

The prediction compensation module 22 may reconstruct data represented as prediction data and residual data by the prediction module (12 of FIG. 5). The prediction compensation module 22 may transform residual data representation of, for example, (253 (prediction), 1 (residual), 2 (residual)) into (253, 254, 255). The prediction compensation module 22 may reconstruct prediction performed in pixel units or in region units according to the prediction module 12.

The inverse quantization module 23 may decompress data compressed by the quantization module (11 of FIG. 1). The inverse quantization module 23 may perform inverse quantization on the data using the QP size determined by the quantization module 11. However, a part of data lost during a compression process may not be completely reconstructed. Accordingly, the inverse quantization module 23 may be utilized only for lossy compressed data.

A decompression controller 24 may receive the header HD together with the payload PL, and may determine a compression ratio of the compressed data CD and whether the compressed data CD is the worst case or the normal case based on a header index of the header HD.

When the compressed data CD is lossless compressed, the decompression controller 24 may provide the compressed data CD to the entropy decoding module 21 and control the entropy decoding module 21 and the prediction compensation module 22 to operate. Because the compressed data CD is not quantized during compression, the inverse quantization module 23 does not operate, and an output of the prediction compensation module 22 may be produced as a reconstructed block BLK.

The decompression controller 24 may provide the compressed data CD to the inverse quantization module 23 when the compressed data CD is lossy compressed and the worst case. The inverse quantization module 23 may perform inverse quantization on the compressed data CD based on a constraint QP size used when the compressed data CD is quantized. An output of the inverse quantization module 23 may be output as the reconstructed block BLK.

The decompression controller 24 may provide the compressed data CD to the entropy decoding module 21 when the compressed data CD is lossy compressed and the normal case. Entropy decoding and prediction compensation may be performed on the compressed data CD, and an output of the prediction compensation module 22 may be provided to the inverse quantization module 23. The inverse quantization module 23 may perform inverse quantization based on a QP value when the compressed data CD is quantized.

The decompression controller 24 may also include a QP table including QP sizes determined by the compression controller 14 to perform compression, and an entropy table including k values, as described above with reference to FIG. 5, and may perform a task to appropriately reflect the k values of the entropy table when decompressing the compressed data CD.

Figure 10:
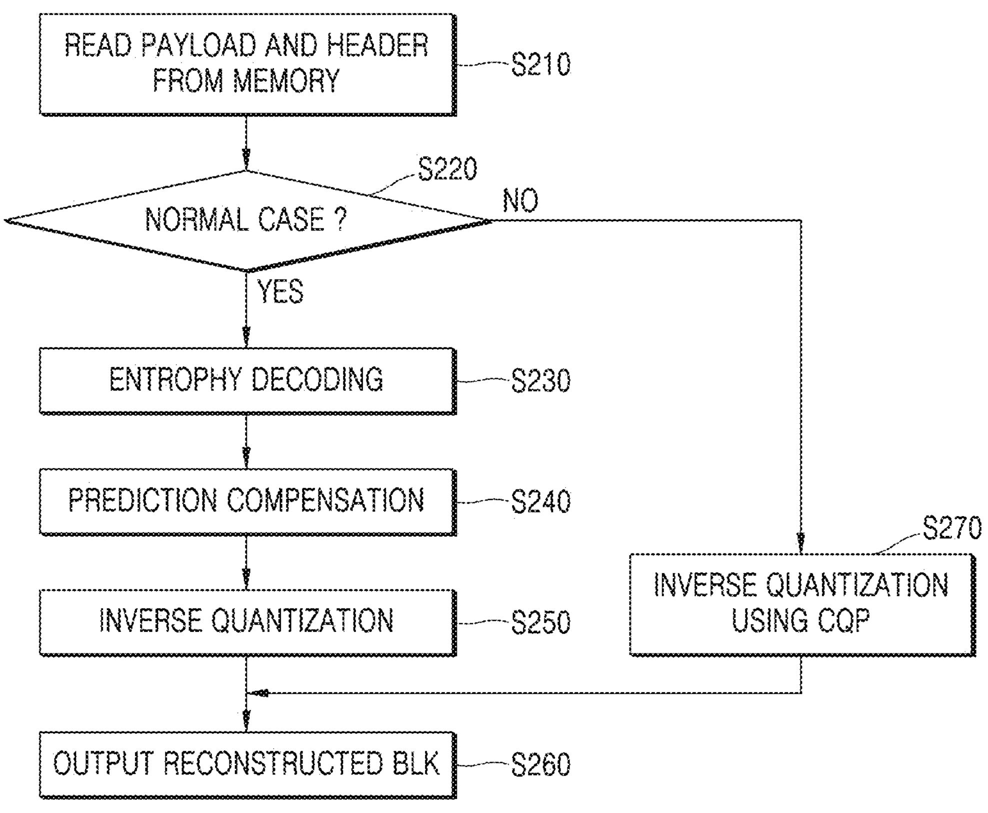
FIG. 10 is a flowchart illustrating a decompression method according to example embodiments.

FIG. 10 is a flowchart illustrating a decompression method according to example embodiments. The decompression method of FIG. 10 may be applied to lossy compressed data (e.g., compressed data compressed by the lossy compression method of FIG. 8) according to example embodiments.

Referring to FIGS. 10 and 9, the decoder 20 (or the compression processing circuit 130 in FIG. 1) may read a payload including the compressed data and a header from the memory (200 in FIG. 1) (S210).

he decompression controller 24 may determine whether the compressed data CD is a normal case based on a header index (S220).

When the compressed data CD is the normal case, the entropy decoding module 21 may perform entropy decoding on the compressed data CD, for example, first decompressed data (S230).

The prediction compensation module 22 may perform prediction compensation on the entropy decoded data (S240). The inverse quantization module 23 may perform inverse quantization on an output of the prediction compensation module 22, e.g., second decompressed data, based on the QP size used when the compressed data CD is compressed. The inverse quantized data, for example, a reconstructed block, may be output (S250).

On the other hand, when the compressed data CD is the worst case, the inverse quantization module 23 may perform inverse quantization on the compressed data CD based on the constraint QP size (270). The compressed data CD may be reconstructed by performing inverse quantization thereon. The inverse quantized data, that is, the reconstructed block BLK, may be output (S260).

As described above, the decoder 20 of the inventive concepts may change a decompression method according to whether the compressed data CD is the worst case or the normal case.

FIGS. 11A and 11B are tables illustrating a quality priority mode and a power priority mode during lossy compression according to example embodiments. FIG. 11A shows the quality priority mode, and FIG. 11B shows the power priority mode.

In FIGS. 11A and 11B, example embodiments in which a block includes 32×4 pixels and a bit-depth of a pixel is 8 bits, 10 bits, or 12 bits are described.

When the bit-depth is 8 bits and a target compression ratio is 50%, the maximum QP size may be 4. The constraint QP size may be set smaller than the maximum QP size, and the constraint QP size in the quality priority mode may be set smaller than the constraint QP size in the power priority mode. For example, in the quality priority mode, the constraint QP size may be set to 2, and in the power priority mode, the constraint QP size may be set to 3 greater than 2.

A worst output bit-depth may be increased from 4 bits when the maximum QP size is applied to 6 bits in the picture quality priority mode and to 5 bits in the power priority mode because the constraint QP size is applied.

A memory footprint may be set based on the constraint QP size, and may be set as a multiple of an access unit (e.g., 32 bytes) of a memory. Accordingly, when a block is quantized based on the constraint QP size in the quality priority mode, the data amount of the compressed data is 96 bytes. Because 96 bytes is three times 32 bytes, the memory footprint may be set to 96 bytes. When the block is quantized based on the constraint QP size in the power priority mode, the data amount of compressed data is 80 bytes. Because 80 bytes is not an integer multiple of 32 bytes, 96 bytes close to 80 bytes may be set as the footprint.

When the bit-depth is 10 bits and the target compression ratio is 60%, the maximum QP size may be 6. In the quality priority mode, the constraint QP size may be set to 4, and in the power priority mode, the constraint QP size may be set to 5. Accordingly, the worst output bit-depth may be increased from 4 bits to 6 bits in the quality priority mode, and may be increased from 4 bits to 5 bits in the power priority mode. All memory footprints may be set to 96 bytes.

When the bit-depth is 12 bits and the target compression ratio is 50%, the maximum QP size may be 6. In the quality priority mode, the constraint QP size may be set to 4, and in the power priority mode, the constraint QP size may be set to 5. Accordingly, the worst output bit-depth may be increased from 6 bits to 8 bits in the quality priority mode, and may be increased from 6 bits to 7 bits in the power priority mode.

The data amount of compressed data in the quality priority mode may be 128 bytes. Because 128 bytes is four times 32 bytes, 128 bytes may be set as the footprint.

The data amount of compressed data in the power priority mode may be 112 bytes. Because 112 bytes is not an integer multiple of 32 bytes, 128 bytes close to 112 bytes may be set as the footprint.

The footprint may be determined by the compression controller 14 of the encoder 10 based on the size of the block and the constraint QP size. The compression processing circuit (130 of FIG. 1) may determine an address (e.g., a logical address) of the memory 200 in which the compressed data is stored based on the footprint.

FIG. 12 is a table illustrating a data amount of compressed data, a header index, and determining a case based on the header index during lossy compression according to example embodiments.

Referring to FIG. 12, it is assumed that the size of the block BLK is 128 bytes and a target compression ratio is 50%. In a normal case, the data amount of compressed data may be equal to or smaller than 63 bytes. The data amount of compressed data in which the first block BLK0 is compressed is 32 bytes. Because the data amount of the compressed data is smaller than the data amount according to a target compression ratio, it may be seen that the compression ratio of the compressed data is higher than the target compression ratio. The first block BLK0 and its compressed data CD are normal cases.

The header index HDI may be an integer multiple of a memory access unit (e.g., 32 bytes). Accordingly, the header index HDI may be set to 1. Header index 1 may indicate the normal case.

The data amount of compressed data in which the second block BLK1 is compressed is 64 bytes. Because the data amount of the compressed data is the same as the data amount according to the target compression ratio, it may be seen that the compression ratio of the compressed data is the same as the target compression ratio. The second block BLK0 and its compressed data CD are normal cases.

The header index HDI may be the integer multiple of the memory access unit (e.g., 32 bytes). Accordingly, the header index HDI may be set to 2. Header index 2 may indicate the normal case.

The data amount of compressed data in which a third block BLK2 is compressed is 96 bytes. Because the data amount of the compressed data is larger than the data amount according to the target compression ratio, it may be seen that the compression ratio of the compressed data is smaller than the target compression ratio. The third block BLK0 and its compressed data CD are worst cases.

The header index HDI may be an integer multiple of the memory access unit (e.g., 32 bytes). Accordingly, the header index HDI may be set to 3. Header index 3 may indicate the worst case.

Figure 13:
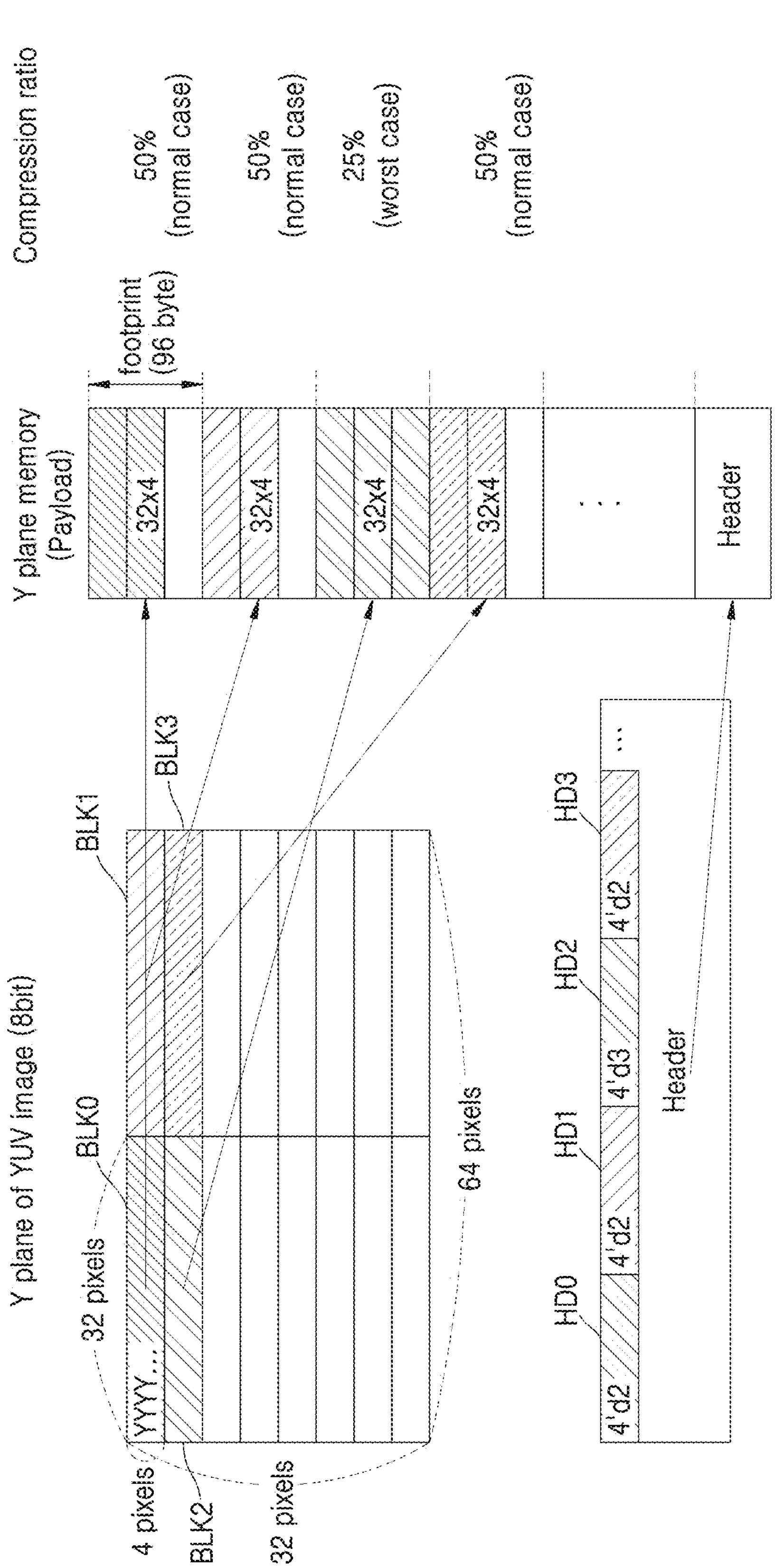
FIG. 13 is a diagram illustrating lossy compressed data stored in a memory according to example embodiments.

FIG. 13 is a diagram illustrating lossy compressed data stored in a memory according to example embodiments.

In FIG. 13, a 64×32 image of a Y plane (luma item) of a YUV image is divided into 8 blocks each including 32×4 pixels, and each block is compressed and stored in a memory of the Y plane. In some example embodiments, the Y plane memory means a storage region of the memory (200 in FIG. 1) allocated to store image data of the Y plane, and the Y plane memory and footprint mean regions distinguished from one another by logical addresses.

The bit-depth of a pixel is 8 bits, and accordingly, the data amount of each block is 128 bytes. When a target compression ratio is 50%, the data amount of compressed data of a block of a normal case may be 64 bytes. When the constraint QP size is 2, the compression ratio is 25%, and the footprint of the memory may be set to 96 bytes with respect to all blocks of image data. In most blocks, that is, blocks of the normal case (e.g., BLK0, BLK1, and BLK3), compressed data may be stored in a part of the footprint. The data amount of compressed data obtained by compressing the third block BLK2 of a worst case based on the constraint QP size may be 96 bytes, and the compressed data of the third block BLK2 may be stored in the whole footprint.

A header may be generated for each of the blocks. A header index may be 2 in the normal case, and a header index may be 3 in the worst case. For example, the header index included in a header HD0 of the first block BLK0 of the normal case may be expressed as 4'd2 (4-bit decimal number 2), and a header index included in a header HD2 of the third block BLK2 of the worst case may be expressed as 4'd3 (4-bit decimal number 3). The headers may be stored in a separate region (e.g., a region distinguished from a region in which a payload is stored) of the Y plane memory.

Figures 14A, 14B, 14C:
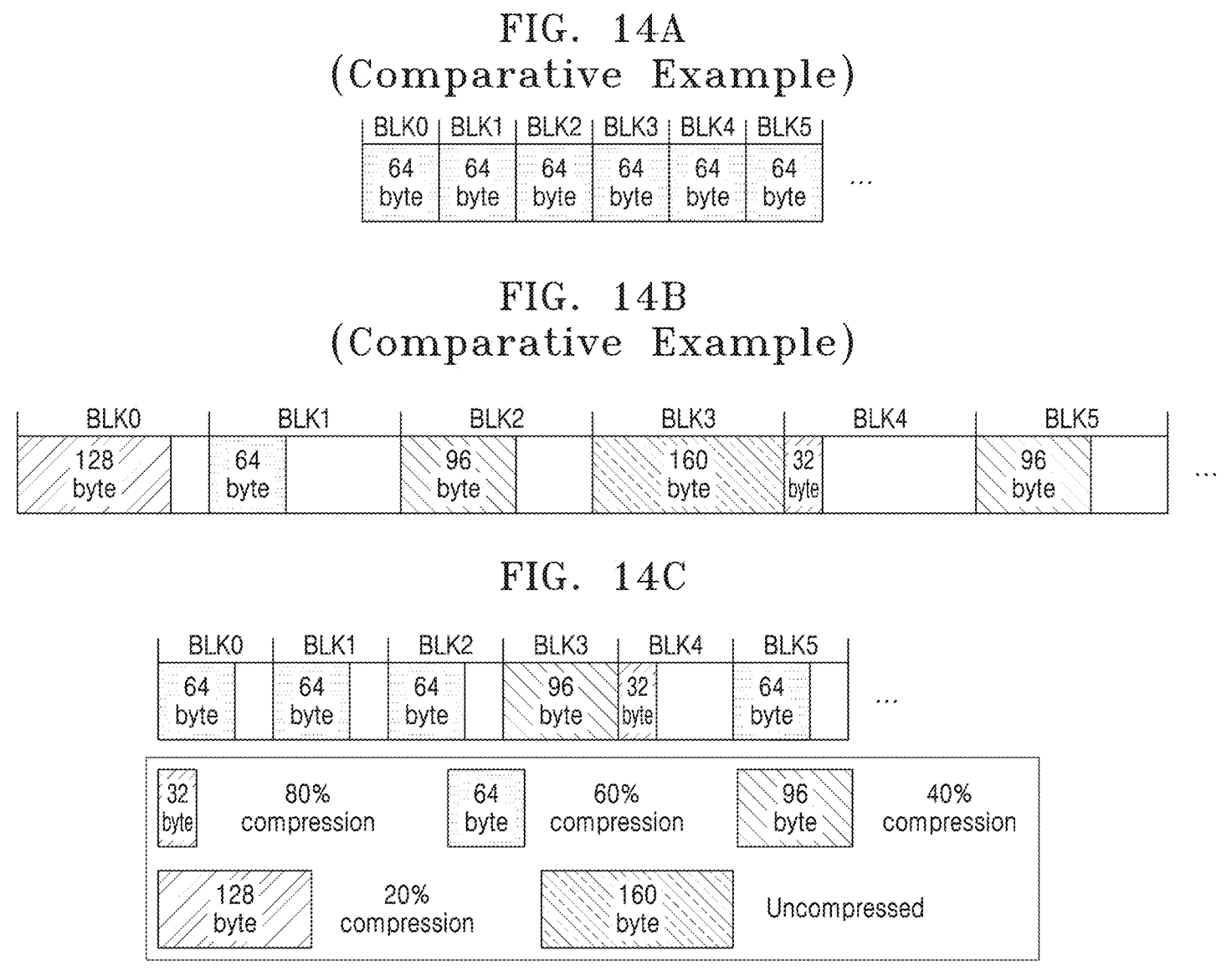

FIGS. 14A, 14B and 14C are diagrams comparing lossy compression according to example embodiments and lossy compression and lossless compression according to comparative examples.

An example where each block includes 16×8 pixels, the bit-depth of each pixel is 10, the fourth block BLK3 among the first to sixth blocks BLK0 to BLK5 is a worst case, the remaining blocks are normal cases, a target compression ratio is 60% during lossy compression, and the constraint QP size is 4 is described.

As shown as FIG. 14A, according to a lossy compression according to a comparative example, the target compression ratio of 60% may be applied to all blocks. All blocks may be compressed to 64 bytes. A footprint of a memory may be set to 64 bytes. In this regard, the QP size of the fourth block BLK3 that is the worst case may excessively increase, and thus, a quantization error may increase, and quality may deteriorate.

As shown as FIG. 14B, according to the lossless compression according to a comparative example, all blocks may be compressed without loss, and compression ratios may be different between blocks. A footprint of a memory may be set to 160 bytes with respect to an uncompressed block. Although there is no quality deterioration, a region of the memory in which compressed image data is stored may be increased.

As shown as FIG. 14C, when lossy compression according to example embodiments is performed, most blocks, for example, the first to third blocks BLK0, BLK1, and BLK2, and the fifth block BLK4 and the sixth block BLK5, may be compressed so that the data amount is equal to or smaller than 64 bytes (that is, compressed by 60%), but the fourth block BLK3 of the worst case may be compressed to 96 bytes because the constraint QP size is 4. A footprint of a memory may be set to 96 bytes. A region of the memory in which compressed image data is stored may be smaller than a region of the memory in which image data compressed according to lossless compression according to the comparative example is stored. In addition, the block of the worst case, for example, the fourth block BLK3, may be quantized based on the constraint QP size, and the data amount after compression may be 96 bytes. With respect to the block of the worst case, the QP size may be reduced or prevented from being larger than the constraint QP size, and thus, an excessive increase in a quantization error may be reduced or prevented.

Figure 15:
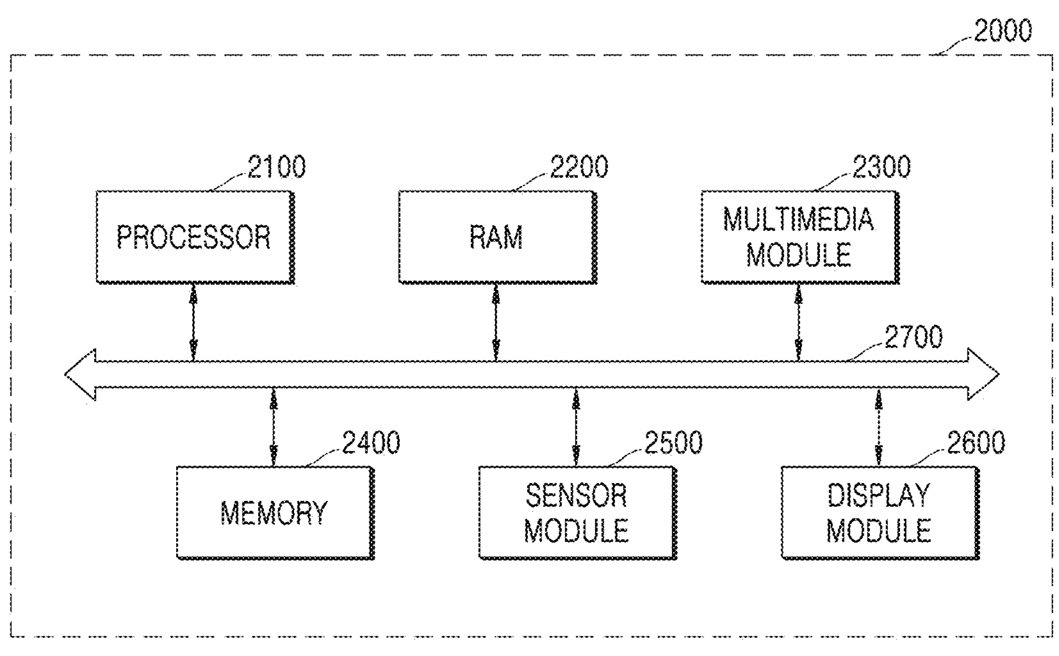
FIG. 15 is a block diagram schematically illustrating an electronic system including a multimedia module according to example embodiments.

FIG. 15 is a block diagram schematically illustrating an electronic system including a multimedia module according to example embodiments.

An electronic system 2000 may be applied to a camera, a smartphone, a smart TV, a wearable device, an Internet of Things (IoT) device, a tablet personal computer (PC), a personal digital assistant (PDA), a portable multimedia player (PMP), a navigation device, a measurement device, etc., and may be applied to a robot device, such as a drone, an advanced driver assistance system (ADAS), etc. Besides the above, the electronic system 2000 may be applied to a device for performing image processing.

Referring to FIG. 15, the electronic system 2000 may include a processor 2100, RAM 2200, a multimedia module 2300, a memory 2400, a sensor module 2500, and/or a display module 2600. Besides, the electronic system 2000 may further include other general-purpose components such as a communication module and a read only memory (ROM). The processor 2100, the RAM 2200, the multimedia module 2300, the memory 2400, the sensor module 2500, and/or the display module 2600 may transmit/receive data to/from each other via a bus 2700. In example embodiments, some components, for example, the processor 2100, the RAM 2200, and/or the multimedia module 2300 may be implemented as a system-on-chip (SoC), and, for example, the SoC may be an application processor.

The processor 2100 may control the overall operation of the electronic system 2000. The processor 2100 may include one processor core (single core) or a plurality of processor cores (multi-core). The processor 2100 may process or execute programs and/or data stored in the memory 2400.

The RAM 2200 may temporarily store programs, data, and/or instructions. According to example embodiments, the RAM 2200 may be implemented as DRAM or SRAM. The RAM 2200 may temporarily store data generated by the processor 2100 or the multimedia module 2300 or data transmitted to the processor 2100 or the multimedia module 2300. In example embodiments, the RAM 2200 may be used as a memory of the multimedia module 2300, for example, the internal memory 120 of FIG. 1.

The multimedia module 2300 may perform image processing on received image data, compress the image data on which image processing is performed, and store the compressed image data in the memory 2400 or display the image data on which image processing is performed on the display module 2600.

The multimedia module 100 of FIG. 1 may be applied as the multimedia module 2300. The multimedia module 100 described above and descriptions of components provided in the multimedia module 100 may be applied to the present example embodiments.

The multimedia module 2300 may include at least one multimedia IP performing image processing and a compression processing circuit compressing or decompressing image data. According to example embodiments described above, the compression processing circuit may perform lossy compression and decompression on the image data based on the target compression ratio and the constraint QP size. When lossy compression is performed, the compression processing circuit may perform quantization on a block of a worst case among the image data based on the constraint QP size, thereby reducing or preventing an excessive increase in a quantization error. The compression processing circuit may transmit a payload including the compressed data and a header including a header index indicating whether the compressed data is a worst case or a normal case to the memory 2400.

The memory 2400 may be implemented as a volatile memory, such as DRAM or SRAM, or a non-volatile memory, such as ReRAM, PRAM, or NAND flash. The memory 2400 may be implemented as a memory card (an MMC card, an eMMC card, an SD card, or a micro SD card), etc.

The memory 2400 may store programs and/or data. In example embodiments, the memory 2400 may store the image data and/or the compressed image data. The memory 2400 may store the compressed data and the header received from the multimedia module 2300 in response to a write request from the multimedia module 2300, and transmit the compressed data and the header to the multimedia module 2300 in response to a read request from the multimedia module 2300. In example embodiments, the compressed data and the header may be transferred between the memory 2400 and the multimedia module 2300 through a DMA circuit.

The sensor module 2500 may include at least one sensor, for example, an image sensor, a voice sensor, an acceleration/gyro sensor, an infrared sensor, a touch sensor, a fingerprint sensor, a proximity sensor, etc. In example embodiments, the sensor module 2500 may include an image sensor, and may store image data generated from the image sensor in the memory 2400 or transmit the image data to the multimedia module 2300.

The display module 2600 may include a display, such as a liquid-crystal display (LCD), an active matrix organic light emitting diode (AMOLED) display, etc., and drive a display based on the image data received from the sensor module 2500 or the multimedia module 2300, thereby outputting an image corresponding to the image data through the display.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An image processing device comprising:

a multimedia intellectual property (IP) configured to generate second image data by performing image processing on first image data; and an encoder configured to, generate first compressed data by performing quantization on a block of the second image data using a quantization step;

generate second compressed data by performing at least one of prediction processing or entropy encoding on the first compressed data;

based on a compression ratio of the second compressed data being equal to or greater than a target compression ratio, transmit the second compressed data and a first header corresponding to the second compressed data, wherein the second compressed data and the first header are stored in a memory;

based on the compression ratio of the second compressed data being less than the target compression ratio, determine whether a quantization step size is greater than a first quantization step, or lower than or equal to the first quantization step;

in response to the quantization step size being lower than or equal to the first quantization step, increase the quantization step to obtain an increased quantization step and generate the second compressed data by performing the quantization using the increased quantization step, and the at least one of the prediction processing or the entropy encoding on the block of the second image data;

in response to the quantization step being greater than the first quantization step, generate third compressed data by performing the quantization on the block of the second image data based on the first quantization step; and transmit the third compressed data and a second header corresponding to the third compressed data, the third compressed data and the second header corresponding to the third compressed data being stored in the memory, wherein the encoder is configured to operate in a quality priority mode and a power priority mode, and the first quantization step is set to a first value in the quality priority mode, the first quantization step is set to a second value in the power priority mode, and the first value is smaller than the second value.

2. The image processing device of claim 1, wherein the first quantization step is smaller than a maximum quantization step, and the maximum quantization step is determined based on the target compression ratio and a bit-depth of a pixel included in the second image data.

3. The image processing device of claim 1, wherein the first header has a first value indicating the compression ratio of the second compressed data, and the second header has a second value indicating a compression ratio of the third compressed data, and the first value and the second value are positive integers, and the second value is greater than the first value.

4. The image processing device of claim 3, wherein the first value and the second value represent a data amount of the second compressed data and the third compressed data, respectively, as a value corresponding to a multiple of an access unit of the memory.

5. The image processing device of claim 3, wherein the memory includes a first region in which the second compressed data and the third compressed data are stored and a second region in which the first header and the second header are stored, and a unit region of the first region in which the second compressed data and the third compressed data are stored is set based on a data amount of the second compressed data.

6. The image processing device of claim 3, further comprising:

a decoder configured to receive the second compressed data or the third compressed data and the first header and the second header from the memory and decompress the second compressed data or the third compressed data.

7. The image processing device of claim 6, wherein the decoder is further configured to perform inverse quantization on the third compressed data based on the first quantization step when the second header indicates that the third compressed data is generated using the first quantization step.

* * * * *